United States Patent [19]

McCafferty

[11] 4,264,277
[45] Apr. 28, 1981

[54] REDUNDANT ROTOR BLADE RETENTION SYSTEM

[75] Inventor: Hugh A. McCafferty, Upper Darby, Pa.

[73] Assignee: The Boeing Company, Seattle, Wash.

[21] Appl. No.: 909,616

[22] Filed: May 26, 1978

[51] Int. Cl.³ .......................... B64C 27/48; F16B 7/20
[52] U.S. Cl. ................................ 416/134 A; 416/140; 416/146 A; 403/348
[58] Field of Search .............. 416/134 A, 136, 138 A, 416/140 A, 146 A; 403/348, 349

[56] References Cited

U.S. PATENT DOCUMENTS

| | | | |
|---|---|---|---|
| 2,047,776 | 7/1936 | Hafner | 416/135 |
| 2,228,243 | 1/1941 | Baker | 403/348 |
| 2,510,377 | 6/1950 | Carr | 403/348 |
| 2,600,531 | 6/1952 | Hafner | 416/131 A |
| 2,643,581 | 6/1953 | Wehrenfennig | 403/349 |
| 2,648,387 | 8/1953 | Doman | 416/134 A |
| 3,297,094 | 1/1967 | Kisovec | 416/134 A |
| 3,545,880 | 12/1970 | Moville | 416/136 |
| 3,824,037 | 7/1974 | Mautz et al. | 416/138 A |
| 4,080,098 | 3/1978 | Watson | 416/138 A |

FOREIGN PATENT DOCUMENTS 385074 12/1932 United Kingdom .................... 416/136

Primary Examiner—John J. Vrablik
Attorney, Agent, or Firm—Lipton, Robert S.; Jack D. Puffer

[57] ABSTRACT

A redundant rotor blade retention system is disclosed. A secondary load path is provided in the event the primary load path of the rotor blade retention system fails. Both the primary and the secondary load path permit rotation of the rotor blade about its pitch axis. The rotor blade is connected to a shaft which forms a portion of the rotor hub. The shaft is pivotally connected to the housing of the rotor hub by a tie-bar, tension-torsion strap, or the like. Flanges which form an integral part of the hub housing and the shaft overlap and are spaced apart from one another. In the event the tie-bar or tension-torsion strap fails, the flanges come in contact with one another and act as a secondary load path. Lubrication is provided so that relative motion about the rotor blade pitch axis may occur between the two flanges thus permitting rotor blade pitch motion.

9 Claims, 5 Drawing Figures

REDUNDANT ROTOR BLADE RETENTION SYSTEM

BACKGROUND OF THE INVENTION

1. Field of the Invention

This invention relates generally to load carrying structural members and in particular to a redundant rotor blade retention system having a passive secondary load path which becomes active in the event the primary load path fails. It is highly desirable that the major structural components of aircraft be provided with multiple load paths so that the likelihood of accidents will be minimized in the event of a structural failure of one of those components. The rotor blades of helicopters and other rotor craft must be secured to the rotor hub in such a manner so as to permit rotation of the blade about a pitch axis. Rotation of the blade about its pitch axis is necessary in order to properly control the aircraft. It is for this reason that any redundant or secondary load path for connecting a rotor blade to a hub should include means for permitting the rotor blade to be rotated abouts its pitch axis.

2. Description of the Prior Art

Rotor blade retention systems which provide a secondary load path are known in the prior art. Many of the prior art systems have been complex and expensive to manufacture. While some of the prior art systems have provided a secondary load path capability they have not permitted the blade to be rotated about its pitch axis when the primary load path fails. Some of the prior art systems fail to lubricate a secondary load path thereby resulting in the limited use thereof.

U.S. Pat. No. 3,942,910 issued Mar. 9, 1976 to Snyder discloses a redundant system for attaching a blade to a helicopter rotor. This system provides a redundant centrifugal load supporting system which allows pitch adjustments of the blade upon failure of the primary load carrying system. It is, however, substantially different from the present invention.

U.S. Pat. No. 2,600,531 issued June 17, 1952 to Hafner suggests, but does not disclose in the drawings, a redundant secondary load path which will carry centrifugal loads. However, no redundancy is provided with respect to enabling the blade to be rotated about its pitch axis.

SUMMARY OF THE INVENTION

An object of this invention is to provide a redundant rotor blade retention system which will permit the blade to be rotated about its pitch axis in the event the primary load path fails.

Another object of the present invention is to provide a dual load path redundant rotor blade retention system which provides lubrication to a secondary means for permitting rotation of the blade about its pitch axis.

A further object of this invention is to provide a redundant rotor blade retention system which is uncomplicated in design.

Still another object of the present invention is to provide a dual load path redundant rotor blade retention system which is structurally uncomplicated and inexpensive to manufacture.

Still another object of the present invention is to provide a redundant rotor blade retention system which provides an indication that the primary load path has failed.

The redundant rotor blade retention system of the present invention is the rotor hub which includes a shaft which is connected to the blade. The shaft is rotatably mounted in a cavity in the hub housing by a tie-rod or tension-torsion strap. The tie-rod in combination with an elastomeric bearing, or the tension-torsion strap, is the primary load path. Due to the torsional properties of the primary load path the shaft is permitted to rotate within the housing thus permitting rotor blade pitch motions. Flanges forming an integral portion of the shaft are positioned inboard of mating flanges which form an integral portion of the hub housing. Lubrication is provided to the bearings which support the shaft within the housing and to the region occupied by the flanges. In the event the primary load path fails the flanges are forced together thus causing them to act as a secondary load path. Due to the lubrication which is provided relative motion between the flanges is facilitated thus permitting rotation of the blade about its pitch axis.

Failure of the primary load path is indicated through slight degradation of the flying qualities of the aircraft due to increased control loads which are necessary to rotate the blade about its pitch axis and to the slight outward displacement of the rotor blade. The present invention is structurally uncomplicated thus resulting in minimal costs, few additional parts, and a minimal increase in weight.

Other and further objectives and advantages will be set forth in the description which follows, taken together with the accompanying drawings.

BRIEF DESCRIPTION OF THE DRAWINGS

In the drawings, in which like numerals refer to like parts.

DESCRIPTION OF THE PREFERRED EMBODIMENT

Figure 1:
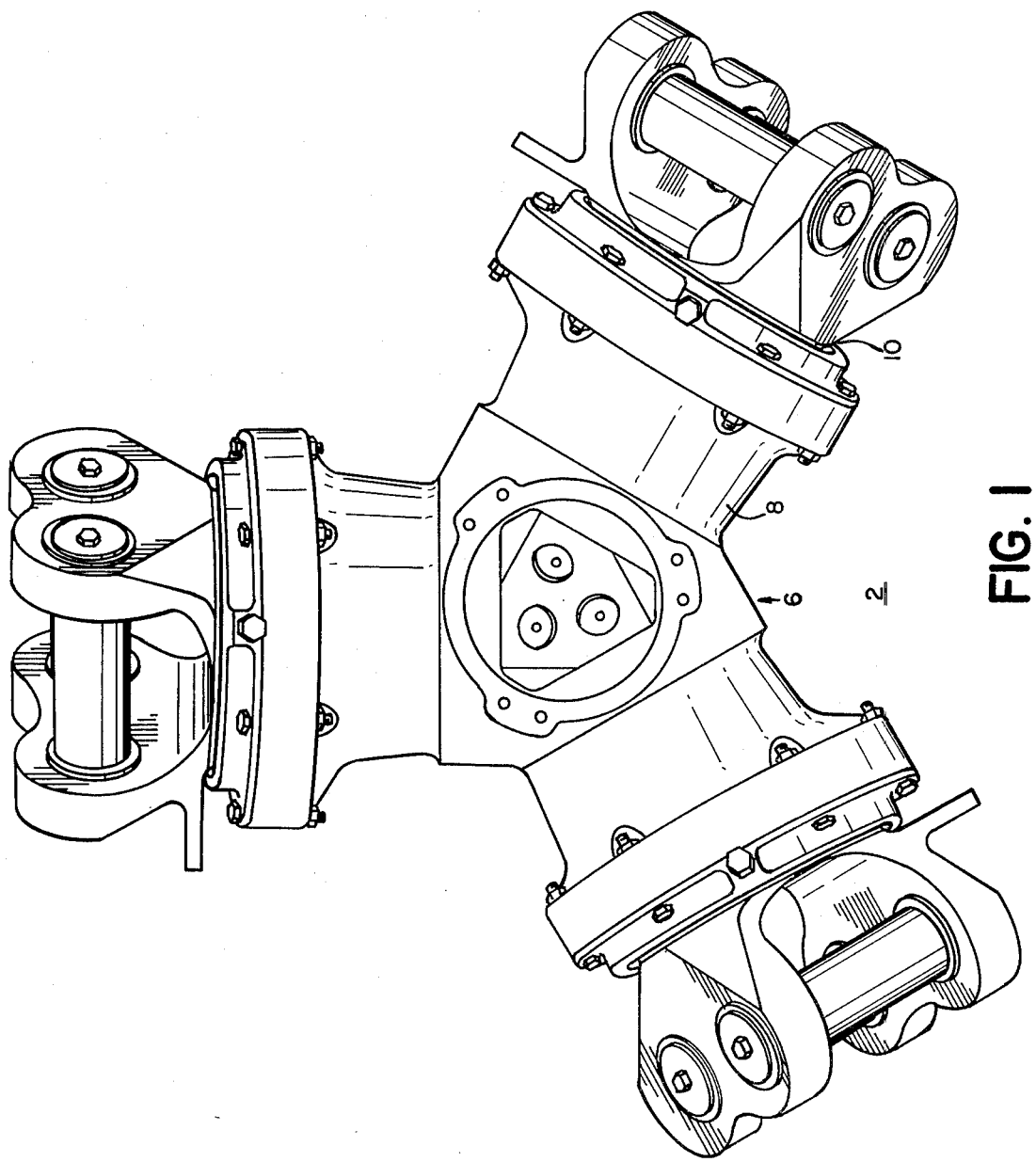
FIG. 1 is a top view of a rotor hub.

Referring now to FIG. 1 which shows a rotor 2, the rotor 2 includes blades (not shown) and hub 6. Hub 6 includes housing arms 8 and pitch shaft 10.

Figure 2:
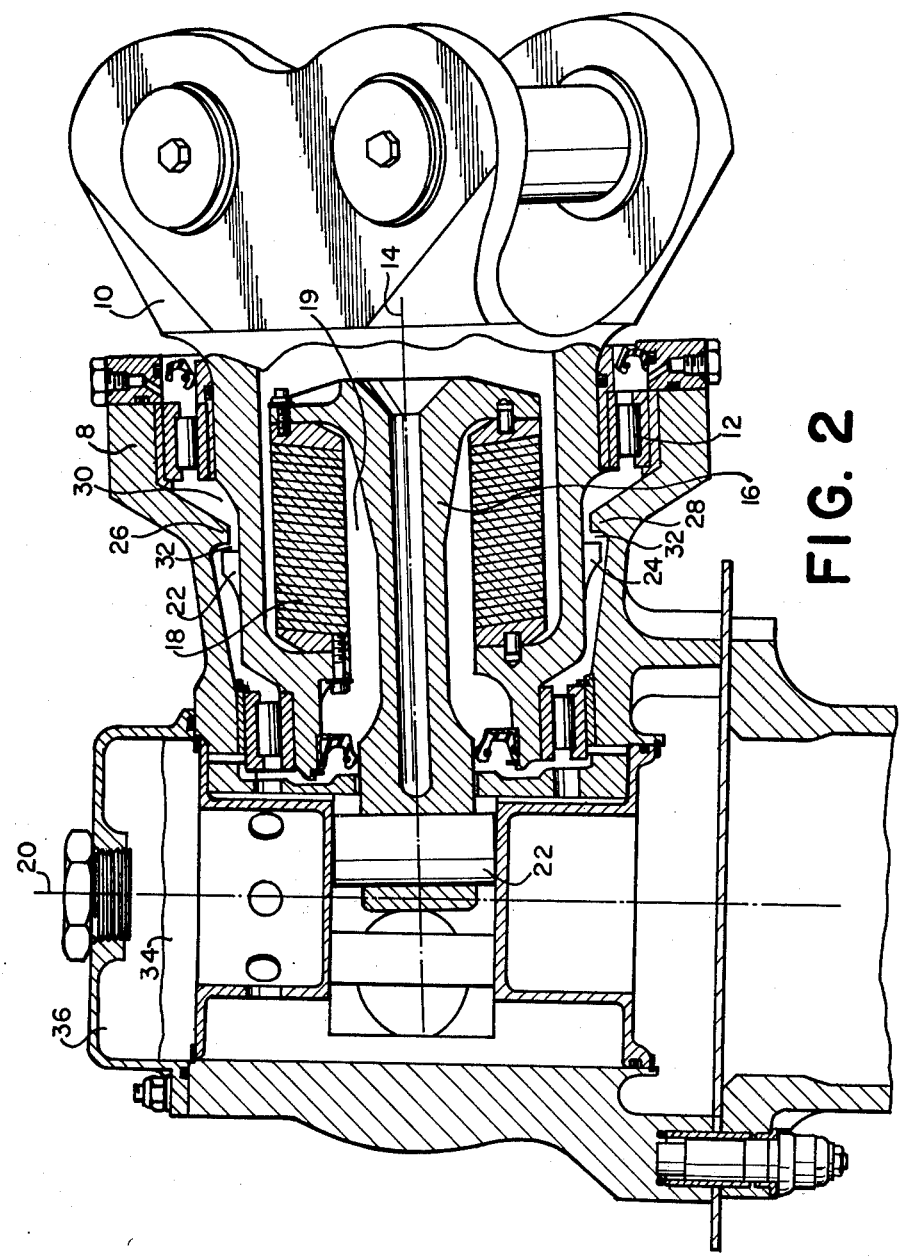
FIG. 2 is an arm of the hub shown in FIG. 1, partially cut away.

Referring now to FIG. 2 which depicts one of the housing arms 8 and its associated with shaft 10, partially broken away. The shaft 10 is mounted to the housing arm 8 by pitch bearings 12. The pitch bearings 12 enable the shaft 10 to rotate within housing 8 thus permitting the rotor blade to be pitched about its pitch axis 14.

The shaft 10 may be connected to the hub 6 which will permit rotation of the shaft 10 about the blades pitch axis 14, to varying degrees depending on the type of aircraft upon which the invention is being used. In the embodiment described herein the shaft 10 is connected to the housing arm 8 by a tie-bar 16 and an elastomeric bearing 18. The tie-bar 16 and elastomeric bearing 18 are partially positioned in cavity 19 formed in shaft 10. The inboard end, i.e. that end closest to the center of rotation, 20 of the hub 6, is connected to the hub 6 by pin 22. The end of the tie-bar furthest from the center of rotation of the hub, i.e. the outboard end, is rigidly connected to the outboard end of the elastomeric bearing 18. The inboard end of the elastomeric bearing 18 is rigidly connected to the inboard of the shaft 10. As may be seen, in this manner centrifugal loads caused by rotation of the hub 6 cause the tie-bar 16 to be placed under a tension load while the elastomeric bearing 18 is subjected to a compression load. Resiliency of the elastomeric bearing 18 permits the shaft 10 to rotate about the pitch axis 14.

Flanges 22 and 24 are connected to the shaft 10 and preferably form an integral part thereof. Flanges 26 and 28 are connected to the inner wall of the housing 8 which forms a cavity 30. It is preferable that flanges 26 and 28 form an integral part of the housing 8.

Figure 3:
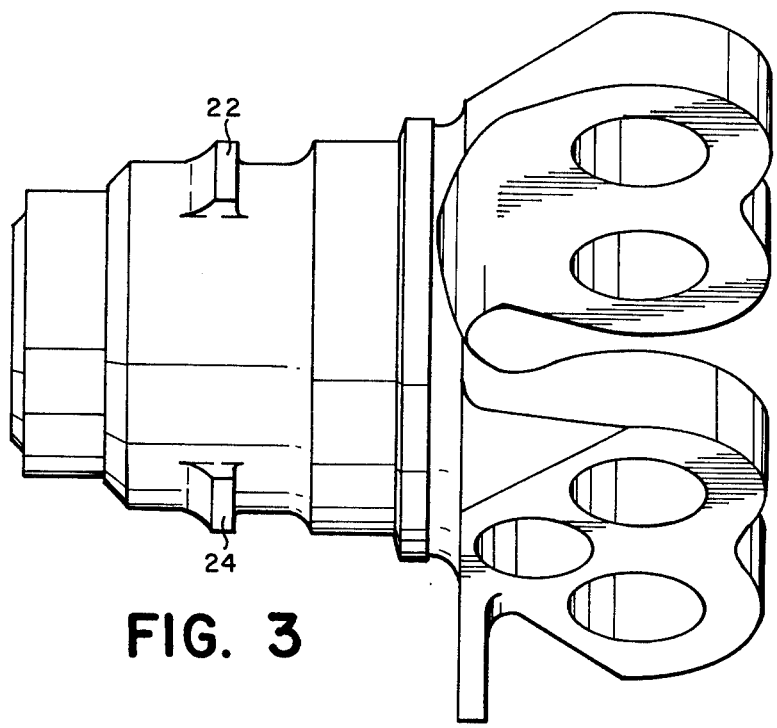
FIG. 3 is a view of the shaft shown in FIG. 2.
Figure 4:
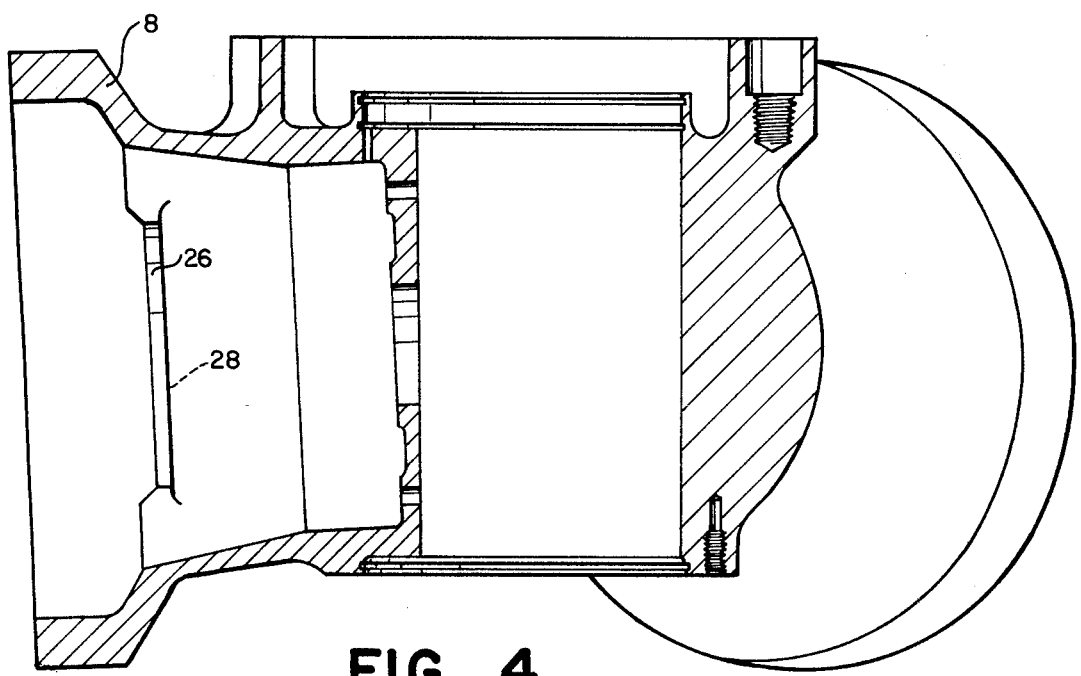
FIG. 4 is a view of the housing shown in FIG. 2, partially cut away.

The pitch shaft flanges 22 and 24 are positioned inboard of the housing flanges 26 and 28 so that there is a gap 32 between the pitch shaft flanges and the housing flanges. The pitch shaft flanges 22 and 24 may be better seen in FIG. 3. Flanges 22 and 24 are diametrically opposed to each other. Each flange must not cover more than 90° of the circumference of the pitch shaft 10. The housing flanges 26 and 28 may be seen in FIG. 4. Flanges 26 and 28 must also be diametrically opposed to one another and each must not cover more than 90° of the cross section of the housing arm 8. The flanges are diametrically opposed and limited to 90° in order to enable the hub to be assembled in bayonett fashion. During assembly the pitch arm 10 is rotated so that the shaft flanges do not encounter the housing flanges when the pitch arm 10 is inserted into the cavity 30 in the housing arm 8. When the arm 10 has been fully inserted into the housing 8 it is then rotated 90° about the pitch axis so that the shaft flanges 22 and 24 are in an opposed relationship with the housing flanges 26 and 28, respectively. Subsequent to assembly the blade pitch control mechanism is connected. It is this mechanism which prevents disengagement of the flanges in the event they act as a secondary load path. Due to rotation of the shaft 10 about the pitch axis the degree of overlap between the shaft and housing flanges will vary.

In the event the elastomeric bearing 18, the tie-bar 16, the pin 22, or any of the other unnumbered connecting devices structurally fail, flanges 22 and 24 will eliminate the gap 32 and come into contact with flanges 26 and 28, respectively due to an outward displacement of the shaft 10 caused by centrifugal force. Motion of the shaft 10 about the blade pitch axis will be permitted due to the relative movement between the shaft and the housing flanges.

The relative movement between the shaft and the housing flanges, which is necessary in order for proper control of the aircraft to be maintained, it is made feasible by a lubrication system. The invention has been designed so that the oil 34 which is used to lubricate the pitch bearing 12 also fills the cavity 30 thus facilitating relative movement between the shaft and housing flanges. Oil 34 is contained in an oil reservoir 36 and is passed to the cavity 30 by passages not shown. Although the invention has been described using a wet, or oil lubrication system it is to be understood that dry lubrications such as TFE coated flanges may also be used.

Figure 5:
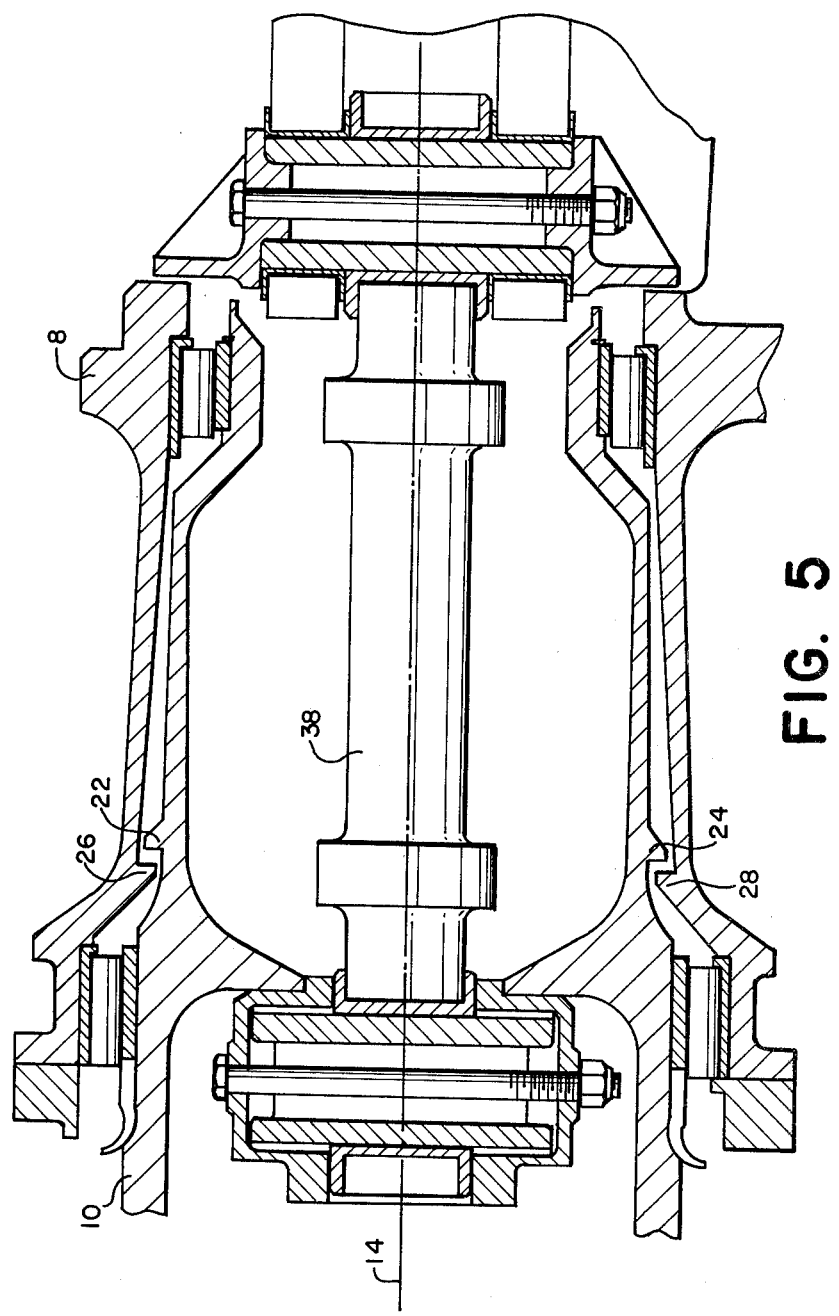
FIG. 5 is a view showing an alternate embodiment of the present invention.

An alternate embodiment of the present invention is depicted in FIG. 5. The shaft 10 is connected to the housing 8 by a tension-torsion strap 38. The tension-torsion strap 38 is connected to the outboard end of the shaft 10 and to the inboard end of the housing 8. The tension-torsion strap 38 is flexible in torsion thereby permitting the shaft 10 to rotate about the blade pitch axis 14. In the event the tension-torsion strap 38 fails structurally the housing 10 will remain secured to housing 8 as a result of flanges 22 and 24 coming into contact with flanges 26 and 28, respectively.

While the redundant rotor blade retention system has been illustrated and disclosed with reference to preferred embodiments it is to be understood that various changes and modifications may be made within the scope and spirit of the invention.

What is claimed is:

1. A tension load carrying structural member permitting torsion for a rotorcraft rotor hub which comprises:
    a housing including, a cylindrical cavity having a longitudinal axis, an inboard end and an outboard end, and a pair of opposed flanges, connected to the wall of said housing, which protrudes into said cavity;
    a cylindrical shaft including an inboard end and an outboard end positioned within said cavity of said housing so that said inboard end is adjacent to said inboard end of said housing, and a pair of opposed flanges connected to said shaft;
    connection means for connecting said housing to said shaft, said connection means being adapted to permit rotation of said shaft with respect to said housing through the use of bearings, carry a structural tension load which is substantially parallel to said longitudinal axis, and to maintain said shaft flanges opposed, spaced and inboard with respect to said housing flanges whereby said tension load may be carried by said housing and shaft flanges in the event said connection means fails structurally; and
    means for lubricating said housing and shaft flanges in the event said connection means fails structurally so as to permit relative movement therebetween with relative ease, thereby permitting the rotorcraft to be controlled.

2. The apparatus of claim 1 wherein each pair of said housing and shaft flanges extend over opposite 90° areas in a plane perpendicular to said longitudinal axis enabling said shaft flanges to pass from an outboard position to an inboard position with respect to said housing flanges thus permitting said shaft to be inserted into said cavity in said housing when said shaft is rotated so that said shaft flanges do not oppose said housing flanges thereby permitting proper assembly.

3. The apparatus of claim 2 wherein said connection means is a tension-torsion strap.

4. The apparatus of claim 3 wherein said shaft is hollow and wherein said strap is positioned therein, said strap being connected to the outboard end of said shaft and the inboard end of said housing.

5. The apparatus of claim 2 wherein said shaft is hollow and wherein said connection means is partially contained therein, said connection means including a tie-bar, for carrying said tension load, connected to an elastomeric bearing which permits torsional movement, said connector means being connected to said shaft and to said housing so that when the member is carrying a tension load said tie-bar is under a tension load while said elastomeric bearing is under a compression load.

6. The apparatus of claim 5 wherein said tie-bar is connected to said inboard end of said housing and said elastomeric bearing is connected to said inboard end of said shaft.

7. A redundant rotor blade retention system for connecting a rotor blade to a rotor hub of a rotor craft which comprises:

a rotor hub including a housing which forms a cylindrical cavity having a longitudinal axis, an inboard end and an outboard end, said inboard end being closer to an axis of rotation of said hub than said outboard end, and a flange connected to said housing which protudes into said cylindrical cavity;

a cylindrical hollow shaft having an inboard end and an outboard end, said outboard end being connected to the blade, and a flange connected to said shaft, said shaft being operably positioned within said cavity of said housing so that said shaft flange is opposed and spaced inboard with respect to said housing flange;

means for lubricating said housing and shaft flanges; and means for connecting said shaft to said hub, said connecting means being adapted to, carry tension loads parallel to said longitudinal axis, permit rotation of said shaft with respect to said hub through the use of bearings, and to permit said shaft flange to be positioned inboard, opposed and spaced with respect to said housing flange; whereby a lubricated redundant load path is provided in the event said connecting means fails structurally, in that event said tension load will be transmitted from said shaft to said hub by virtue said shaft flange coming into contact with said housing flange.

8. The rotor blade retention system of claim 7 wherein said connecting means includes a tension-torsion strap partially contained within said shaft and connected to the outboard end thereof, and connected to the inboard end of said housing.

9. The rotor blade retention system of claim 8 which includes a tie-bar connected to an elastomeric bearing, said tie-bar being connected to said inboard end of said housing, and said elastomeric bearing being connected to said inboard end of said shaft so that said tie-bar carries said axial load while said elastomeric bearing is subjected to a compression load, said elastomeric bearing permitting rotation of said shaft with respect to said hub.

* * * * *

UNITED STATES PATENT AND TRADEMARK OFFICE
CERTIFICATE OF CORRECTION

PATENT NO. : 4,264,277
DATED : April 28, 1981
INVENTOR(S) : HUGH A. MC CAFFERTY

It is certified that error appears in the above-identified patent and that said Letters Patent are hereby corrected as shown below:

Please amend Claim 9 as follows:

Line 12, delete the number "8" and substitute therefore --7--.

Signed and Sealed this

Seventeenth Day of November 1981

[SEAL]

Attest:

Attesting Officer

GERALD J. MOSSINGHOFF

Commissioner of Patents and Trademarks